US011266911B1

(12) United States Patent
Tran et al.

(10) Patent No.: US 11,266,911 B1
(45) Date of Patent: Mar. 8, 2022

(54) SYSTEMS AND METHOD FOR IDENTIFYING MODIFIED PROGRAM DATA

(71) Applicant: Nintendo Co., Ltd., Kyoto (JP)

(72) Inventors: David Tran, Remond, WA (US); Eugene Borisov, Redmond, WA (US); Tanner Stevens, Redmond, WA (US)

(73) Assignee: NINTENDO CO., LTD., Kyoto (JP)

(*) Notice: Subject to any disclaimer, the term of this patent is extended or adjusted under 35 U.S.C. 154(b) by 0 days.

(21) Appl. No.: 17/026,482

(22) Filed: Sep. 21, 2020

(51) Int. Cl.
*A63F 13/73* (2014.01)
*A63F 13/77* (2014.01)
*A63F 13/75* (2014.01)
*G06F 21/57* (2013.01)
*H04L 9/32* (2006.01)
*G06F 8/41* (2018.01)

(52) U.S. Cl.
CPC .............. *A63F 13/73* (2014.09); *A63F 13/75* (2014.09); *A63F 13/77* (2014.09); *G06F 8/433* (2013.01); *G06F 21/57* (2013.01); *H04L 9/3239* (2013.01)

(58) Field of Classification Search
CPC .......... A63F 13/73; A63F 13/75; A63F 13/70; A63F 13/71; A63F 2300/532; A63F 2300/401; A63F 2300/552; A63F 2300/5586; G07F 17/323; G07F 17/3241; G06F 21/57; H04L 9/3239
See application file for complete search history.

(56) References Cited

U.S. PATENT DOCUMENTS

| | | | |
|---|---|---|---|
| 6,578,132 B1* | 6/2003 | Shimomura | G06F 12/1408 711/220 |
| 8,370,935 B1* | 2/2013 | Jakobsson | G06F 21/567 726/22 |
| 8,544,089 B2* | 9/2013 | Jakobsson | G06F 21/56 726/22 |
| 9,278,289 B2* | 3/2016 | Bannister | A63F 13/73 |
| 9,805,196 B2* | 10/2017 | Ray | A63F 13/75 |
| 10,257,189 B2* | 4/2019 | Chen | H04L 63/0428 |
| 10,270,770 B1* | 4/2019 | Irwan | H04L 9/3239 |
| 10,320,569 B1* | 6/2019 | Wentz | H04L 9/0866 |
| 10,729,980 B2* | 8/2020 | Mojarad | A63F 13/352 |
| 10,860,303 B2* | 12/2020 | Sirois | G06F 8/65 |
| 11,070,980 B1* | 7/2021 | Hohler | H04W 12/06 |
| 2008/0254850 A1* | 10/2008 | Sylla | G07F 17/323 463/16 |
| 2009/0222910 A1* | 9/2009 | Le Bihan | G06F 21/57 726/19 |
| 2010/0223656 A1* | 9/2010 | Ray | H04L 9/3271 726/3 |
| 2014/0295955 A1* | 10/2014 | Bannister | A63F 13/69 463/29 |
| 2014/0325498 A1* | 10/2014 | Sirois | G06F 8/65 717/170 |

(Continued)

*Primary Examiner* — William H McCulloch, Jr.
(74) *Attorney, Agent, or Firm* — Nixon & Vanderhye, P.C.

(57) ABSTRACT

The technology described implements attestation programs that employ "code reuse" techniques. In particular, the technology relates to auto-generating attestation programs for, among other aspects, detecting whether a program has been modified. In one non-limiting example, the technology uses a tool that scans a software program (e.g., a video game) code for usable code sequences. The tool can automatically combine code sequences to generate a large number of attestation programs of different variety (e.g., memory checks, hashing).

20 Claims, 7 Drawing Sheets

(56) References Cited

U.S. PATENT DOCUMENTS

| | | | |
|---|---|---|---|
| 2015/0347117 A1* | 12/2015 | Tokunaga | G06F 1/3234 |
| | | | 717/173 |
| 2016/0253664 A1* | 9/2016 | Yuan | H04L 63/0281 |
| | | | 705/71 |
| 2017/0346814 A1* | 11/2017 | Chen | H04L 9/0618 |
| 2020/0206635 A1* | 7/2020 | Mojarad | H04N 1/32144 |

* cited by examiner

SYSTEMS AND METHOD FOR IDENTIFYING MODIFIED PROGRAM DATA

TECHNICAL OVERVIEW

Video game systems have enabled players to participate in various different gaming environments for decades. Games are designed in a manner so that the players are presented with a finite set of parameters, boundaries, and rules in which to play the game. For example, a video game may allow a player to "level up" to a certain amount, or the player may be "restricted" from certain movement in the game environment (e.g., walking through walls). Certain players may modify the game program and/or game metadata in a manner that was not intended by the original designer(s) of the game. For example, the player may modify the software so that the game character can level up faster or walk through walls in the game. Thus, certain drawbacks exist when designing a video game environment in a manner that reduces or restricts modification in this manner.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyrights whatsoever.

DETAILED DESCRIPTION OF EXAMPLE NON-LIMITING EMBODIMENTS OF THE TECHNOLOGY

Figure 1:
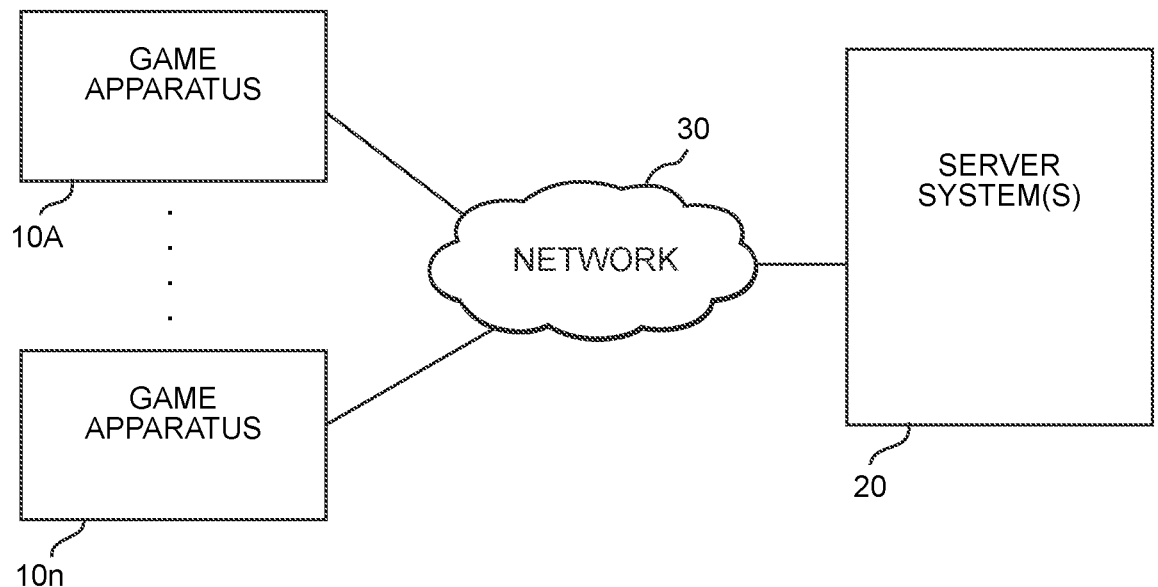
FIG. 1 shows a block diagram of a non-limiting example system.

Software programs are capable of restricting users from performing certain actions (or accessing certain features) for various reasons. For example, business software products (e.g., word processing applications) may restrict users from certain functionality (e.g., printing or editing a document) until the user has agreed to purchase such features. Likewise, video game technology may restrict users from both unlocking certain features (or DLC) as well as prevent users from performing various actions in the gaming environment (i.e., "cheating").

Cheating in video games has been prevalent almost since the dawn of gaming Decades ago, users could press specific buttons in a specific order in certain games to unlock features, such as the amount of player "lives." Video game cheating has evolved greatly over the years to a point where users can modify the software and/or metadata to gain an unfair advantage.

Such cheating is egregiously prevalent where the gaming environment is extended to multiplayer gaming (particularly multiplayer gaming over the internet). In particular, users are able to modify software in a way that enables them to have advantages over other players on different systems across a multiplayer game. These unfair advantages result in the game being much less satisfying to the user thereby affecting the overall human-user experience and interaction in the game. Moreover, such modifications to the game program create certain security risks for the game system.

Certain conventional technology exists for detecting when a user may have modified their particular software program. For example, a conventional attestation architecture exists for using attestation programs to detect whether software has been modified. The system employs a client-server architecture where an attestation program is selected from the server and transmitted to the client device. The client can execute the attestation program and reply to the server with an attestation result. The server can compare the result to an expected result and, if a mismatch is detected, the client is flagged as "compromised." The system administrator(s) could determine what type of action to take against the "compromised" client (e.g., banning the user, sending a warning, no action).

As a more specific non-limiting example, the server may detect a "mismatch" in the data using a hashing technique. It should be appreciated that certain program data may run the attestation program to generate a hash result which will produce a known (e.g., fixed-length) value as output. The hash result can be obtained by the server and verified against the known value to determine if a "mismatch" occurs. If the result generates a "mismatch," the server will then identify the program as being modified and thus the client system will be marked as "compromised."

The conventional approach is advantageous because it allows the game system to determine if different users have modified the software so that the system administrator(s) can take appropriate action. However, the conventional approach has certain drawbacks. As an example, under the conventional approach, a user could compromise the hash function in the game (or attestation logic) and then a developer will be required to create and deploy a patch to all client devices running the game program. Moreover, the conventional approach requires cooperation from the client-side devices for executing the attestation logic at the client and thus true detection of "cheating" cannot be done "remotely" on the server-side (or remote-side) system.

The technology described herein thus improves upon the conventional approach, in part, by using attestation programs that employ "code reuse" techniques. As a non-limiting example, certain return-oriented programming ("ROP") or jump-oriented programming ("JOP") techniques can be used by "attackers" to bypass security defenses by selecting specific sequences of instructions already present in system memory and execute the instructions out of the intended order to achieve a functionality that may not have been originally present in the software.

The technology described herein can use ROP/JOP techniques for automatically building attestation programs from code sequences already present in the game. As an example, there may be thousands of usable code sequences in a typical game. By themselves, these sequences are not necessarily related to a particular attestation program/approach. But, these code sequences can be chained together in a combination to perform a new function (e.g., memory check, hashing operation).

Attestation results computed by each attestation program is dependent on the used code sequences. Since there are thousands of usable code sequences in a typical game, results cannot be easily predicted and faked. The logic described herein does not necessarily need to rely on any secrets (e.g., keys, algorithms) and can work even when the system is completely compromised.

The technology thus can rely on a large number of possible combinations that each potentially generate a different result. It should be appreciated that the complexity of the attestation logic can be scaled up in response to certain conditions (e.g., by using different code sequences, or more code sequences chained together). Updating the logic in this manner advantageously does not require releasing a patch for a software program.

The technology described herein thus relates to auto-generating attestation programs for, among other aspects, detecting whether a program has been modified. In one non-limiting example, the technology uses a tool that scans a software program (e.g., video game) code for usable code sequences. The tool can automatically combine code sequences to generate a large number of attestation programs of different variety (e.g., memory checks, hashing).

Each selected code sequence in the attestation logic may perform a specific operation (e.g., load from memory, a math operation, a call to a hash function). A final attestation result may depend on both a value at a test location in the software memory and the operation performed by each code sequence. For example, a code sequence N may use multiplication by a constant, or an addition with a constant, to transform a value read from memory. Each program can generate a unique "good" result where a server may maintain database(s) of expected "good" results per the attestation program. An "attestation check" can be performed by the server based on a program running on a particular client to determine if the client may have modified the program.

In order to fake a result of attestation, an attacker has to analyze the program, extract code sequences and the code sequences associated order, and analyze what each code sequence does. As there are normally a large number of usable code sequences in a typical software program, doing so in real time would be very difficult. Thus, the technology described herein advantageously allows the system to generate and store a multitude of attestation programs allowing the system to "remotely" detect when a program has been modified (e.g., for "cheating").

This Summary is provided to introduce a selection of concepts in a simplified form that are further described below in the Detailed Description. This Summary is intended neither to identify key features or essential features of the claimed subject matter, nor to be used to limit the scope of the claimed subject matter; rather, this Summary is intended to provide an overview of the subject matter described in this document. Accordingly, it will be appreciated that the above-described features are merely examples, and that other features, aspects, and advantages of the subject matter described herein will become apparent from the following Detailed Description, Figures, and Claims.

In the following description, for purposes of explanation and non-limitation, specific details are set forth, such as particular nodes, functional entities, techniques, protocols, etc. in order to provide an understanding of the described technology. It will be apparent to one skilled in the art that other embodiments may be practiced apart from the specific details described below. In other instances, detailed descriptions of well-known methods, devices, techniques, etc. are omitted so as not to obscure the description with unnecessary detail.

Sections are used in this Detailed Description solely in order to orient the reader as to the general subject matter of each section; as will be seen below, the description of many features spans multiple sections, and headings should not be read as affecting the meaning of the description included in any section.

Example System for Identifying Modified Program Data

FIG. 1 shows a non-limiting example of a system 1 including one or more game apparatuses 10A-n communicating with server system(s) 20 over a network 30. As a non-limiting example, game apparatus 10A-n can play various games over network 30 to participate in a multi-player gaming environment. Each game apparatus 10A-n could constitute a portable game device, a stationary game console, and/or a hybrid machine usable in both a stationary and portable configuration. The examples are of course non-limiting and the system may use any type of information processing apparatus to constitute game apparatus 10A-n.

It should be appreciated that the network 30 could comprise a network of interconnected computing devices, such as the Internet. The network 30 could also comprise a local area network (LAN) or could comprise a peer-to-peer connection between the different devices in the system 1.

The server system(s) 20 could comprise any variety of server devices including, but not limited to, database servers, file servers, web servers, application servers, a server cluster (e.g., a cloud-based computing environment), a standalone server, and/or any other portable or stationary computing device having server-based capabilities. It should be appreciated that the server system(s) 20 can be implemented using separately located hardware (e.g., remote hardware) or can be implemented using a same piece of hardware (e.g., within a single housed server device).

As a non-limiting example, user(s) may execute a certain game using game apparatus 10A-n and then play the game in a multiplayer game mode. In such a mode, the user(s) may initiate a remote connection with server system(s) 20 and enter into a game lobby to set up a multiplayer gaming environment among a plurality of users. In the lobby of the multiplayer gaming environment, at least one user may customize the multiplayer gaming environment by selecting a game mode type, a game map, and/or game characteristics (e.g., number and difficulty of game bots, weapon types, shield types), among other aspects.

As the user plays in the multiplayer gaming environment, the user may perform certain actions to benefit themselves and/or perform certain actions that are used to defeat other users. As a non-limiting example, users may play a multi-player first person shooter game where the user may attempt to "shoot" other enemy characters. These users could play as individuals where every other user is an "enemy," or they could play on teams where certain characters may be "ally" characters while other characters may be "enemy" characters.

Figure 2A:
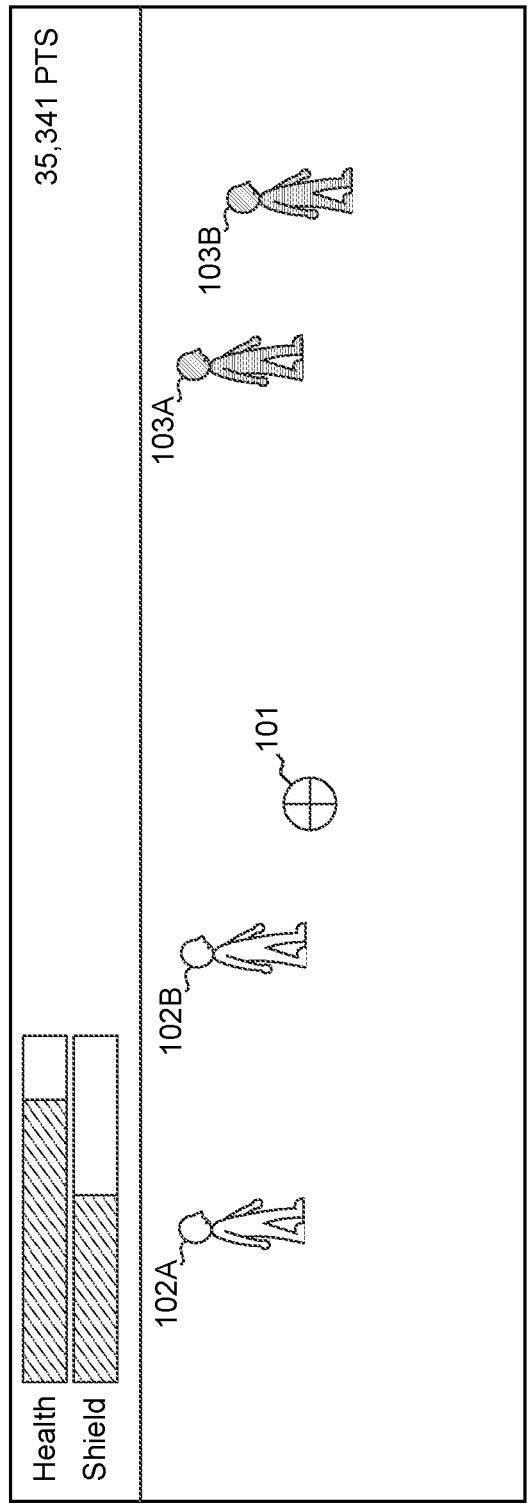
FIGS. 2A and 2B show non-limiting example user interfaces generated and/or displayed by client devices associated with the system.
Figure 2B:
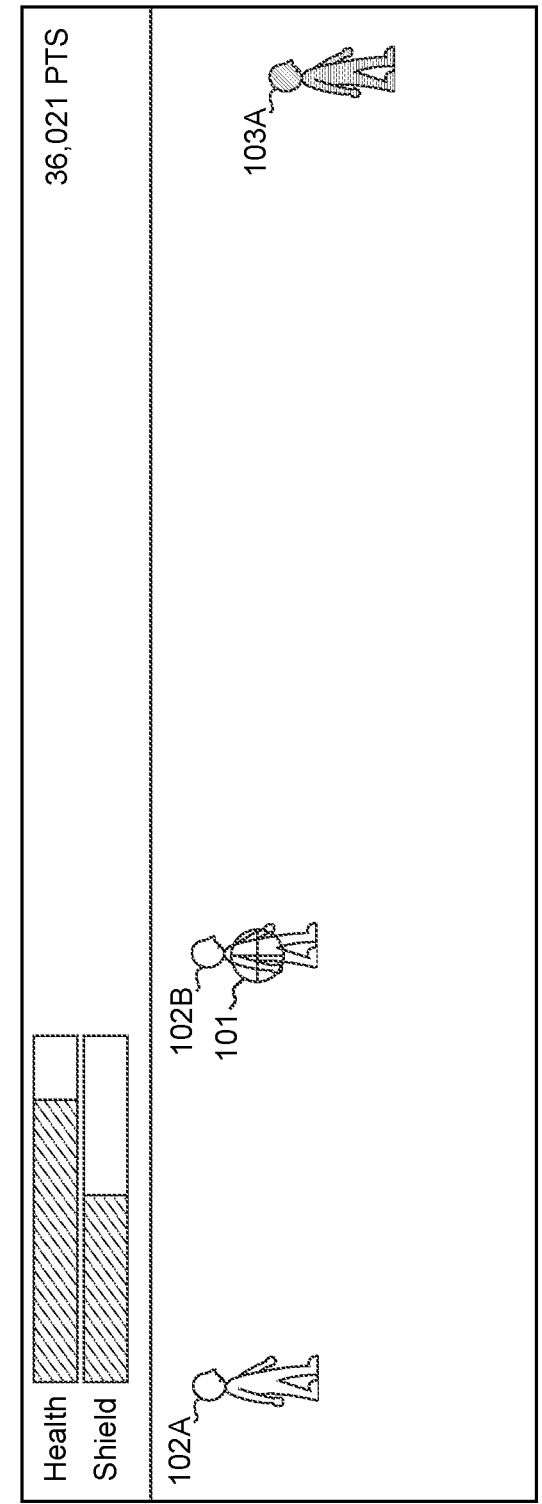

FIGS. 2A and 2B show non-limiting example user interfaces 100 of a game that can be played by one or more users operating game apparatuses 10A-n. In one non-limiting example, FIGS. 2A and 2B shows a first person shooter game where the user can maneuver in a virtual space from a "first person" perspective. While playing the game, the user may move a targeting reticle 101 to aim within the virtual space.

As a non-limiting example, and as shown in FIG. 2A, the user may see different enemy objects 102A and 102B in which the user can aim the targeting reticle 101. The user interface 100 may also show different ally characters 103A and 103B in which the user may avoid aiming and shooting at in the virtual space. In certain non-limiting example games, the user may be restricted from shooting at and/or damaging ally characters 103A and 103B under "friendly fire" restrictive techniques.

FIG. 2B shows a non-limiting example of a point in the game where user has aimed at enemy object 102B. In the example shown in FIG. 2B, the user has positioned targeting reticle 101 so that enemy object 102B is now in the user "sights" and thus the user can shoot at and hit enemy object 102B. In doing so, the user may damage (or destroy) enemy object 102B while obtaining "points" for taking such action.

At the conclusion of the game, the users may be ranked based on certain criteria (e.g., highest point total, number of "kills"). The leaderboard of different players may be displayed at the end of the gameplay showing where the specific user "placed" among the other users. Likewise, the system could report the in-game performance to server system(s) 20 where the user may be ranked among a larger population of users. Likewise, server system(s) 20 may reward the user for their particular performance by, for example, providing virtual currency to the user and/or unlocking certain game features, among other aspects.

In the example shown in FIG. 2B, the user may employ a modification to the program running on their specific game apparatus and thus the user may be able to "cheat" in the multiplayer game environment. For example, the user may have modified the game program to execute an "auto-aim" cheat allowing the user to easily and automatically aim at enemy object 102B. In doing so, the user can very easily target different enemy objects (102A/B) and more quickly obtain a higher score (thereby potentially unlocking more game benefits). The technology described herein, in one non-limiting example, allows for detection of modification of different game programs.

Figure 3:
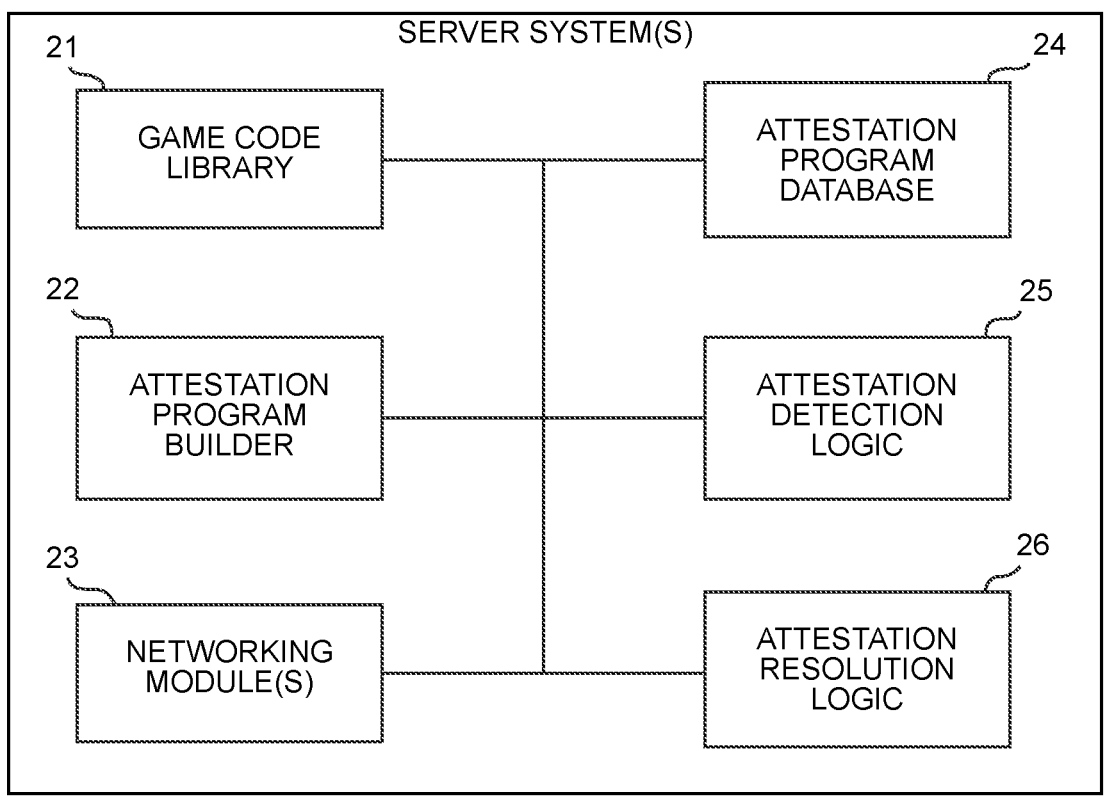
FIG. 3 shows a non-limiting example block diagram of internal components comprising a server system.

FIGS. 3-6B depict various aspects of the technology in which the system can detect modification of programs running at a client-side device (e.g., game apparatus 10A-n). FIG. 3 specifically shows a non-limiting example server system 20 for generating and maintaining different attestation programs. The example server system 20 may use a tool to automatically create different attestation programs associated with individual games to determine if a user may have modified the program running on the user's terminal.

As a non-limiting example, server system 20 may include a game code library 21 that contains game code for different games. For example, the game code library 21 may contain game code for the first person shooter game shown in FIGS. 2A and 2B. The game code library 21 could, of course, contain code for hundreds (or thousands) of different games in which server system 20 can utilize such game code in building the attestation program. It should be appreciated that the game code may be original source code of a game, or the game code could include program binary of a game. Of course, the example described in this application relates to game code but is not limited herein. In other words, the technology envisions carrying out the novel techniques described in this application in association with any software program including, but not limited to, system software, application software, freeware, shareware, open-source, and/or cloud based software, among other types.

Server system 20 may also include an attestation program builder 22 that can build one or more attestation programs associated with different game programs/software titles. In one non-limiting example, attestation program builder 22 may use the game code from game code library 21 to analyze the code for generating different attestation programs. These attestation programs could generate different results that correspond to techniques associated with modifying the game/software program at the client-side device.

Server system 20 may also include networking module(s) 23 for performing a networking function of server system 20. For example, the networking module(s) 23 can implement transmission control protocol (TCP) and/or user datagram protocol (UDP) for communicating across network 30. These examples are of course non-limiting and networking module(s) 23 can perform any variety of communication using different protocols including, but not limited to, hypertext transfer protocol (HTTP), file transfer protocol (FTP), Internet Protocol (IP), and the like.

It should be appreciated that server system 20 may use networking module(s) 23 to communicate with different game apparatuses 10A-n. In one non-limiting example, different server system(s) 20 may use networking module(s) 23 to execute a multiplayer gaming environment between different apparatuses 10A-n. As another non-limiting example, server system(s) 20 may use networking module(s) 23 to interact with apparatuses 10A-n in order to implement attestation logic to determine whether software has been modified on each apparatus 10A-n. These examples are of course non-limiting and the technology described herein envisions any variety of methods in which server system(s) 20 may communicate with different game apparatuses 10A-n.

As mentioned herein, the system(s) 20 may generate different attestation programs associated with a particular game (e.g., using attestation program builder 22). Once each attestation program is generated, the program may be stored in an attestation program database 24 of the system 20. In one non-limiting example, attestation program database 24 may be or include one or more of: a relational database management system (RDBMS); an object-oriented database management system (OODBMS); an object-relational database management system (ORDBMS); a not-only structured query language (NoSQL) data store; an object cache; a distributed file system; a data cluster (based on technology such as Hadoop); and/or any other appropriate type of data storage system).

Server system(s) 20 may also include attestation detection logic 25 for determining whether a program has been modified by a client-side device (e.g., game apparatus 10A). As a non-limiting example, attestation detection logic 25 may interface with a game apparatus 10A-n and use one or more attestation programs stored in attestation program database 24. Attestation detection logic 25 could compare results generated from the client-side device to the results stored in attestation program database 24 to determine if a particular modification (e.g., auto-aim cheat) has been performed on the client-side device 24.

Server system(s) 20 could further include attestation resolution logic 26 for determining an appropriate resolution based on the detection of attestation detection logic 25. As a non-limiting example, upon determining that the client-side device has modified a particular program (e.g., using attestation detection logic 25), attestation resolution logic 26 may execute a procedure to "resolve" the detection. For example, attestation resolution logic 26 may "flag" the client-side device to indicate that the user operating the device has been "cheating."

The attestation resolution logic 26 could perform certain corrective/disciplinary action such as locking (or banning) the user account, warning the user of the detected "cheating," or correcting the client-side device to remove the "cheat" (e.g., using a software "patch"). Likewise, attestation resolution logic 26 may not perform any action and may just simply "flag" the user (or client-side device) noting the "cheating" with the possibility of taking certain action at a later date.

It should be appreciated that the components shown in FIG. 3 can be implemented within a single system. The components could also be incorporated in multiple systems and/or a distributed computing environment (e.g., a cloud computing environment). Thus, the system is not limited to a single component and can be incorporated into multiple components.

Figure 4:
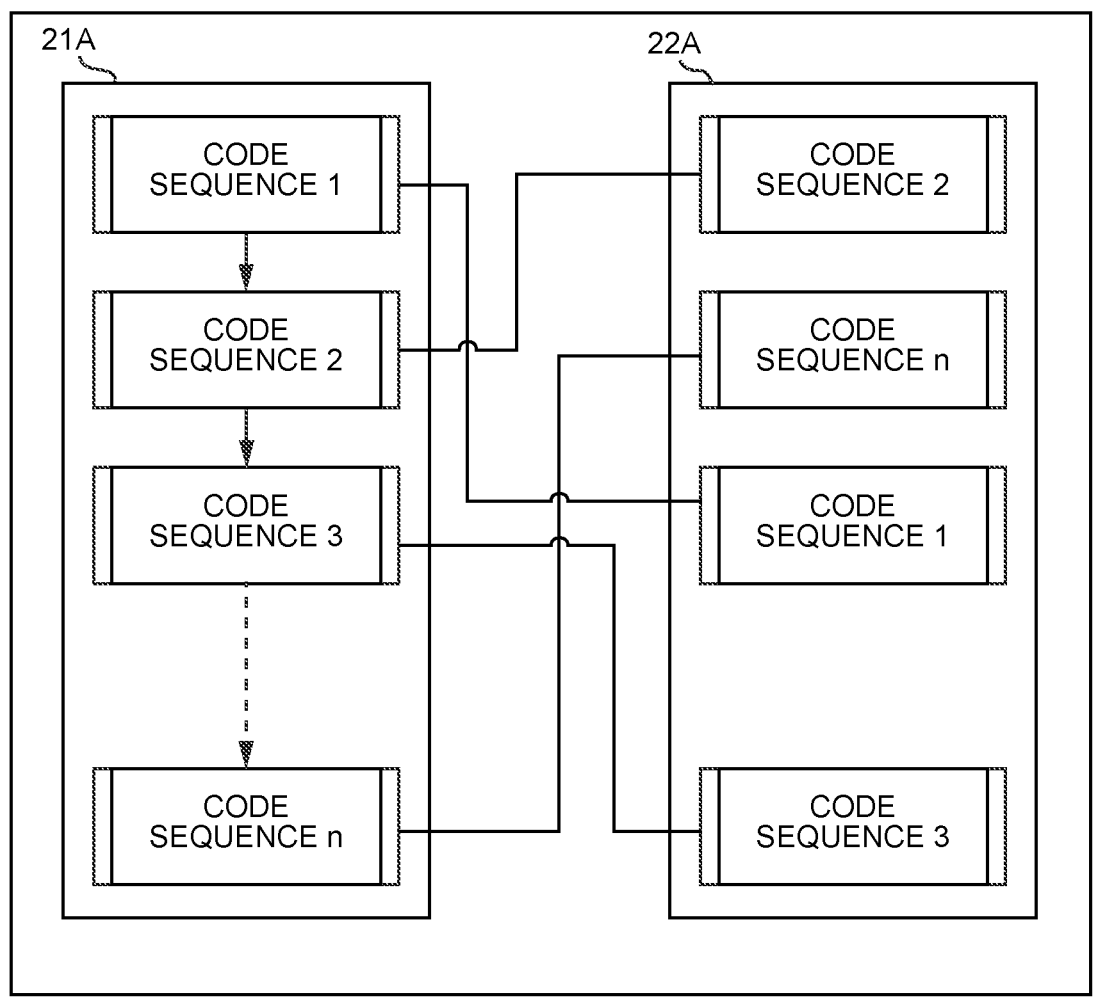
FIG. 4 shows a non-limiting example block diagram of generating an example attestation program.

FIG. 4 shows a specific non-limiting example embodiment of the attestation program builder 22 building one or more attestation programs using code from game code library 21. In the example shown in FIG. 4, the builder 22 can build a specification attestation program 22A using game code 21A stored in game code library 21.

In the example shown in FIG. 4, game code 21A may contain different code sequences 1-n. As a non-limiting example, these different code sequences could include a collection of different instructions in a particular program language, or could include a combination of different programming "blocks" that include pointers to different memory locations as well as "calls" to different functions.

In the example shown in FIG. 4, game code 21A may include code sequences 1-n to execute a game cycle for a particular game. For example, code sequences 1-n may perform functions that include accepting and processing user input, executing game logic based on the input, executing artificial intelligence logic, and/or updating the output sound and display of the game.

The attestation program builder 22 may automatically re-arrange the execution order of code sequences 1-n to generate any number of attestation algorithms of different variety (e.g., memory checks, hashing). Each code sequence may perform a specific operation (e.g., load from memory, math operation, call to hash function). The attestation program builder 22 may automatically generate attestation programs, corresponding to attestation algorithms, by listing references to usable code sequences in the game binary in the order they are used by the attestation algorithm.

The final attestation result (e.g., attestation program 22A) may depend on both the value at the test location in a game's "memory" and the operation performed by each code sequence. For example, code sequence n (shown in attestation program 22A) may use multiplication by a constant value, or an addition with a constant value to transform a value read from memory. As a non-limiting example, code sequence 2 in program 22A may read a value from memory at a specific location (e.g., location to test), while the next code sequence n could transform the value through some type of operation (e.g., add a constant, perform logical operation). The following code sequence 1 could perform a memory hash operation while the next code sequence 3 could combine the result of the hash operation with a transformed value from the memory read. The final output for attestation program 22A would produce a result that can be stored and later compared to a result from a client-side device to determine whether modification of a client-side program has occurred.

As another example, a "final" attestation program for testing a modification at a memory location A may be built out of four code sequences. These sequences could include (1) read value from memory location A and place the read value in register R, (2) multiply value in register R by a constant1 and store result in register R, (3) add constant2 to register R and store result in register R, and/or (4) return result in register R to the server system(s) 20. If, in another program, the execution order of sequences (2) and (3) is swapped (or instead of using sequence (2) and (3), sequence (2) is used twice in a row), the result of the attestation program sent to server system(s) 20 will change. The result is still dependent on the value at memory location A, but the result is also dependent on the execution order of the sequences and operation performed by each sequence. It should be appreciated that the value at memory location A could produce a "golden value" stored at server system(s) 20. If a user attempts to modify the result at memory location A (e.g., to achieve a desired game cheat), the result of the attestation program run in association with memory location A will differ from that stored in server system(s) 20 thus notifying system(s) 20 that a modification has occurred in the game.

It should be appreciated that server system(s) 20 could maintain a database (e.g., in database 24) of results per each attestation program. With the stored results, the server system(s) 20 could compare results produced from the client-side devices (e.g., game apparatus 10A-n) to determine whether a modification has been detected.

It should be appreciated that, to fake a result of an attestation program, an "attacker" would need to analyze the program, extract code sequences and their order, and analyze what each code sequence does. As there are numerous amounts of usable code sequences in a typical game, this process is extremely difficult to implement in real-time. Thus, the system 1 described herein advantageously allows for "remote" detection of cheating.

Figure 5:
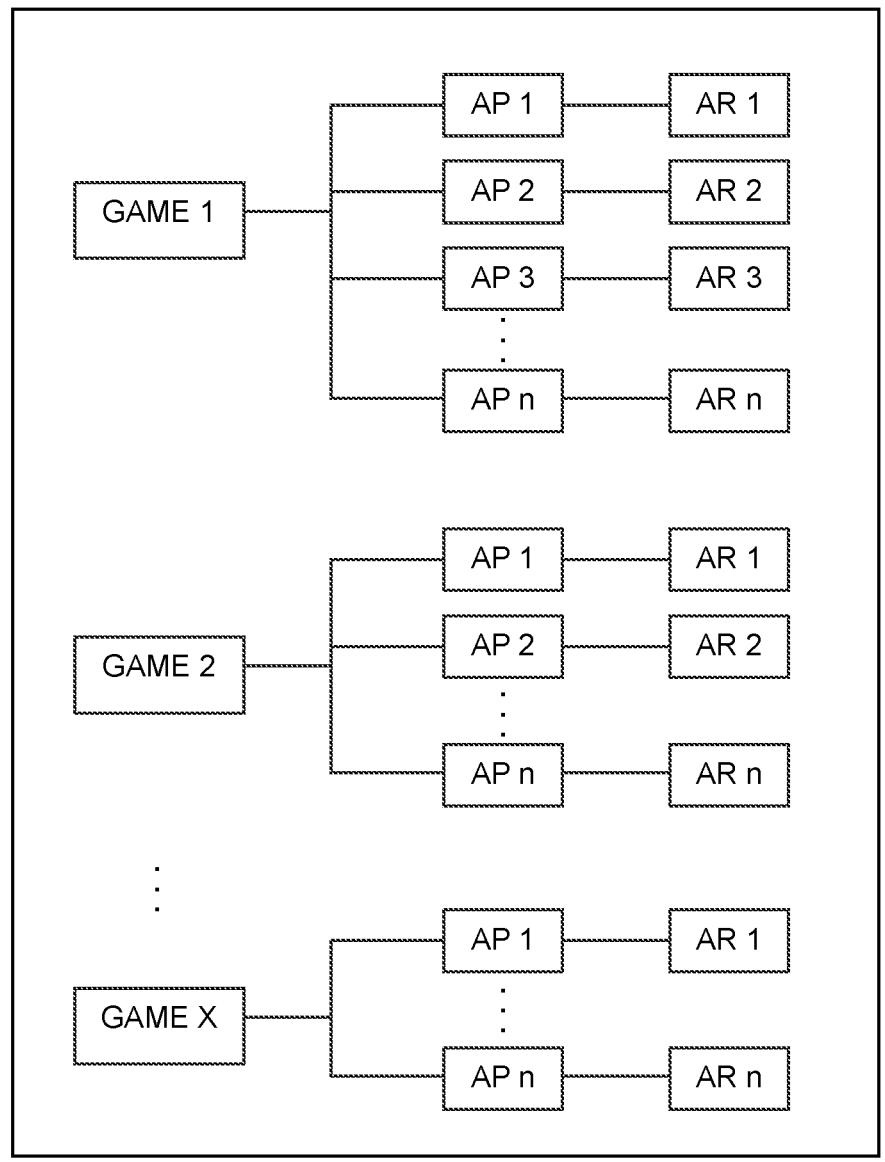
FIG. 5 shows a non-limiting example block diagram of a database of the system.

FIG. 5 shows a non-limiting example of an attestation program database 24 storing different results for different attestation programs associated with various games. In one non-limiting example, the database 24 can store each of the attestation programs generated by attestation program builder 22 in which attestation detection logic 25 can access for determining if software modification has occurred at a client-side device.

In the example shown in FIG. 5, attestation program database 24 contains different attestation programs for games 1-X. The games 1-X could include any type of video game including, but not limited to, shooter video games (e.g., first person shooter, third person shooter), action video games, adventure video games, sports video games, puzzle video games, and/or dance video games.

As a non-limiting example, and as discussed herein, attestation program builder 22 can scan code from games in game code library 21 to generate different attestation programs associated with each game. The attestation programs will produce a specific result that can be compared to a game running on a client-side terminal in order to determine if the client-side program has been modified.

In the example shown in FIG. 5, attestation program database 24 includes games 1-X. Each of games 1-X contain their own associated attestation programs. For example, game 1 could be directed to a first person shooter game where the first person shooter game has attestation programs AP1-n generated for the game. Each of these attestation programs AP1-n will produce respective attestation results AR1-n.

It should be appreciated that each of games 2-X have their associated attestation programs AP1-n for each game, with each program AP1-n producing respective attestation results AR1-n. As discussed herein, the system 1 can perform an "attestation check" against a program running on a client-side device and compare it to one or more of the results AR1-n stored in database 24. For example, an "attestation check" can be run against game apparatus 10A for game 1 where the "attestation check" can produce a result from game apparatus 10A.

As a specific example, server system(s) 20 may send an attestation program to game apparatus 10A. The attestation program could include references to code sequences that are transmitted to game apparatus 10A. It should be appreciated that each program stored/running on game apparatus 10A-n may have an associated thin library that understands an attestation request received by an apparatus 10A-n from server system(s) 20. The attestation request (e.g., attestation program) will cause an apparatus 10A to generate an attestation result which will then be sent back to server system(s) 20.

In more detail, this result from game apparatus 10A can be communicated to server system(s) 20 (e.g., using networking module(s) 23)) where server system(s) 20 can compare the result to one stored in database 24. For example, an "attestation check" may be performed against game apparatus 10A playing game 1 to detect a specific "auto-aim" cheat feature. The "auto-aim" cheat feature could correspond to one generated by attestation program AP1 having a corresponding attestation result AR1. It should be appreciated that one target may be detection of broadly distributed exploits (e.g., cheats). For example, the desired exploits may be of a type that any user possessing no technical knowledge can install on their system (such exploits can be found on web-sites such as "maxcheats.com"). The technology described herein can compute attestation results for games with such specific modification and store such results together with the programs. Thus, each attestation program stored on server system(s) 20 will have (1) an expected "golden result", (2) one or more exploits and their corresponding "bad" results, and/or (3) certain "unknown" results where the exploit may not yet have been identified.

The system(s) 20 can run a query of the result produced by game apparatus 10A playing game 1 against database 24 to determine if a particular result matches one stored in database 24. The system(s) 20 could perform such a query using a standard database query language (e.g., SQL). In doing so, the system(s) 20 can detect if a certain modification have been made by apparatus 10A in association with this particular feature (e.g., "auto-aim" cheat) for game 1 and, upon detection, system(s) 20 can then take some type of administrative action.

These examples are of course non-limiting and the system envisions any variety of method for storing and comparing attestation results to results produced from different "attestation checks" on client-side devices. Moreover, a certain "cheat" may be detected from a number of different attestation programs and thus one "cheat" is not limited to only one attestation program. Put another way, a specific cheat for a game may be reproduced using a number of attestation programs (each having different attestation results).

Figure 6A:
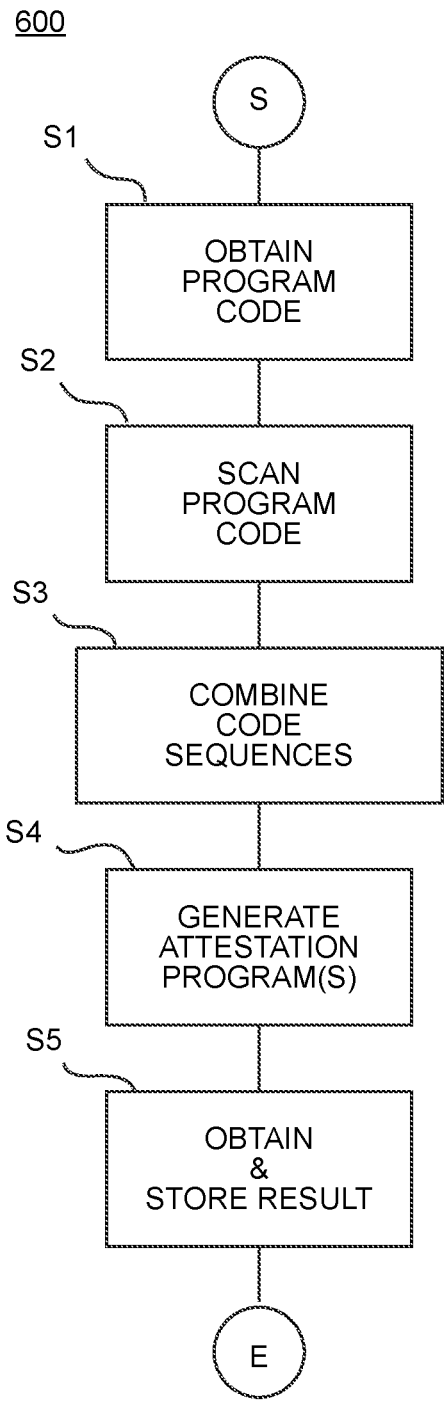
FIGS. 6A and 6B show non-limiting example flowcharts for processes carried out by the system.
Figure 6B:
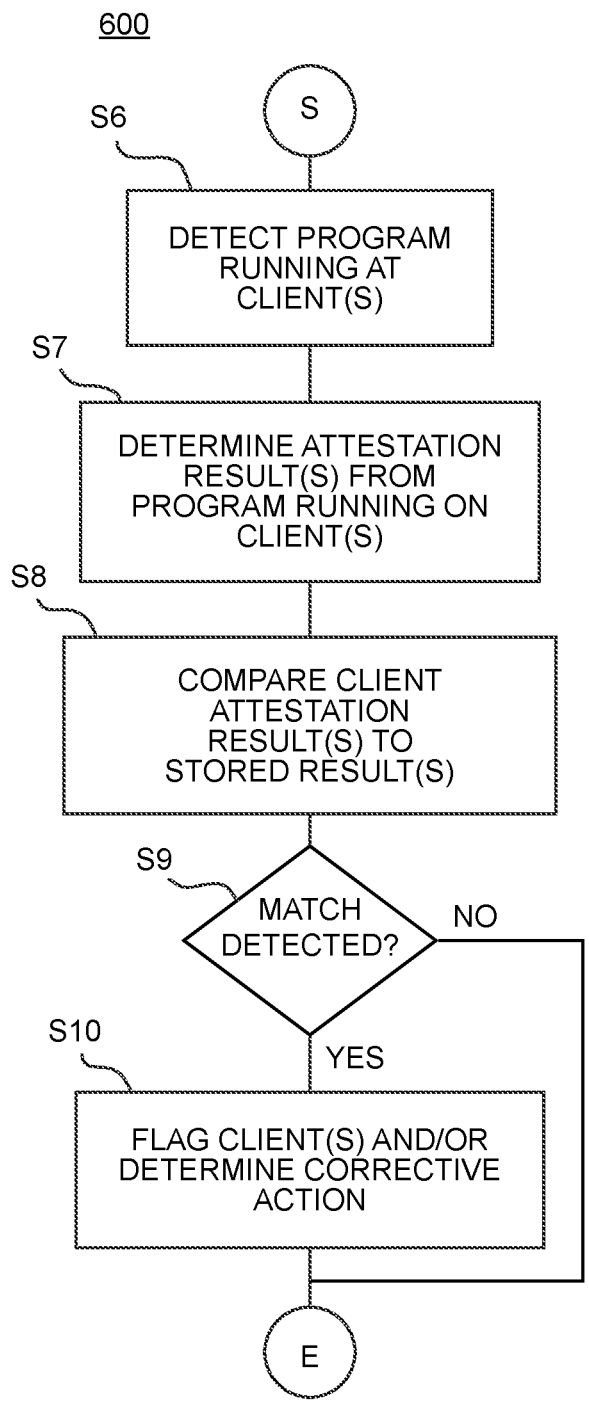

FIGS. 6A and 6B show non-limiting example flowcharts 600 for processes carried out by system 1. FIG. 6A specifically shows a flowchart 600 for a non-limiting process of generating one or more attestation programs (e.g., using attestation program builder 22. FIG. 6B specifically shows a flowchart 600 for a non-limiting process of detecting a modification and carrying out "corrective" action (e.g., using attestation detection logic 25 and/or attestation resolution logic 26). It should be appreciated that the processes shown in FIGS. 6A and 6B can be carried out by system 1 (e.g., using server system(s) 20). Of course, this example is non-limiting and the processes shown in FIGS. 6A and 6B can be executed under a variety of different methods.

The process begins with system 1 obtaining program code (e.g., from game code library 21) for a given program (action S1). For example, system 1 may obtain program code for game 1 related to a first person shooter game. The game code could contain thousands (or hundreds of thousands) of code sequences nested within various functions of the game software. Each of these functions may call other functions or include pointers to different areas of memory for performing a specific task. As mentioned herein, it should be appreciated that the program could include source code of the program, or could include program binary.

At action S2, the system 1 can scan the program code (e.g., scan program binary using attestation program builder 22) for usable code sequences. As a non-limiting example, the program code may contain certain code sequences that, by themselves, are not related to any attestation purpose. But, certain code sequences can be combined to produce a desired attestation algorithm.

At action S3, the system 1 can combine these code sequences to generate an attestation algorithm producing a specific result. As discussed herein, the original game code may include an intended execution sequences (i.e., implementing game logic). The system 1 can combine from these sequences to "strategically" achieve a desired functionality. In one example, the desired functionality may include checking memory locations for modifications and/or performing hash checking of memory.

At action S4, the system 1 uses these combined code sequences to generate an attestation program. As a non-limiting example, system 1 could use a collection of combined code sequences to generate attestation programs for detecting a specific "cheat" in a particular game (e.g., auto-aim, walk through walls, level-up player characters).

The result of the attestation program may be maintained in a database (e.g., attestation program database 24) of the system (at action S5). In one non-limiting example, the attestation result can be associated with each attestation program for a particular game. These pairings can be seen, for example, in FIG. 5 described herein.

FIG. 6B thus shows a non-limiting example flowchart 600 for performing an "attestation check" against one or more client-side devices. The process begins at action S6 where the system 1 can detect certain programs running on a client-side device. As a non-limiting example, server system(s) 20 may detect that game apparatus 10A is executing game 1 in a multiplayer game environment.

At action S7, the system 1 can perform an "attestation check" against the client-side device. For example, server system(s) 20 can communicate with game apparatus 10A using networking module(s) 23 over network 30. Server system(s) 20 can perform an "attestation check" of game 1 running on game apparatus 10A to produce one or more attestation results. In one non-limiting example, system(s) 20 may send references to certain code sequences to a game apparatus 10A. Game apparatus 10A may utilize the thin library associated with a particular game to generate a result associated with the references to the code sequences sent from system(s) 20. The result can be generated and sent from game apparatus 10A to server system(s) 20.

At action S8, the system 1 can compare the attestation result produced by the client-side device to those stored in the database memory of the system 20 (e.g., attestation program database 24). As a non-limiting example, and as discussed herein, the client-side device could produce an attestation result corresponding to a particular game cheat. This result can be queried against database 24 for the particular game. It should be appreciated that the database may include a "good" result corresponding to the software functioning properly on the client-side device. The database 24 may also include a "bad" result corresponding to a known cheat. Likewise, database 24 may also store an "unknown" result that does not match the known "good" result but also does not match any known "bad" results (e.g., cheats).

If a match is found (action S9), the system can flag the client-side device and/or take certain corrective action (action S10). In the situations where the result does not match a "good" result or a "bad" result, it is possible that the client-side device did not make any modification, but there is a hardware malfunction, or the client-side device made a modification that did not match a result in database 24. Likewise, if the client-side device returns a "good" result, then the process may end as the software may not have been modified by the client-side device.

It should be appreciated that, based on whether a match is detected, the system 1 can determine how to most appropriately proceed. That is, if the result returned by the client-side device matches a known "bad" result, or if the result returned matches an "unknown" result (or does not match any value stored in database 24), system 1 may flag the client-side device as having modified a particular program (e.g., for cheating purposes). System 1 may also determine some type of administrative/corrective action to carry out against client-side device. For example, system 1 may only send a warning to the client-side device (e.g., using email or messaging service(s)) notifying the user that the particular modification has been detected. System 1 may also perform certain disciplinary actions such as locking the game (or user terminal) and/or temporarily or permanently banning the user.

It should be appreciated that in some instances, the result output from client-side device may not match a stored "good" or "bad" result and thus there may not be enough evidence to determine if any modification occurred. Thus, system 1 may also decide to take no corrective action against the client side device. For example, system 1 may determine that the particular result obtained by client side device could have been generated by accident or through some type of "glitch" on the client side device. In this case, system 1 may neither flag the client-side device nor take any corrective/administrative action against the device. Likewise, system 1 may determine that the device should be flagged but that no other corrective action should be taken.

In certain example embodiments, system 1 may flag these devices and maintain a list of devices flagged that produce similar results. If more devices begin returning similar results to that of the flagged device, it may be indicative of a new cheat in which system 1 does not have a corresponding attestation program for detecting such a cheat. After a period of time, the result may be determined as corresponding to a particular type of cheat and thus the corrective action could be taken at that point against client-side devices producing the previously "unknown" result. These examples are of course non-limiting and the system envisions any variety of actions that could be carried out upon finding an "attestation match."

It should be understood that, although actions S1 through action S5 and action S6-S10 are described above as separate actions with a given order, this is done for ease of description. It should be understood that, in various embodiments, the above-mentioned actions may be performed in various orders; alternatively or additionally, portions of the above-described actions (action S1 through action S10) may be interleaved and/or performed concurrently with portions of the other actions (action S1 through action S10).

Figure 7:
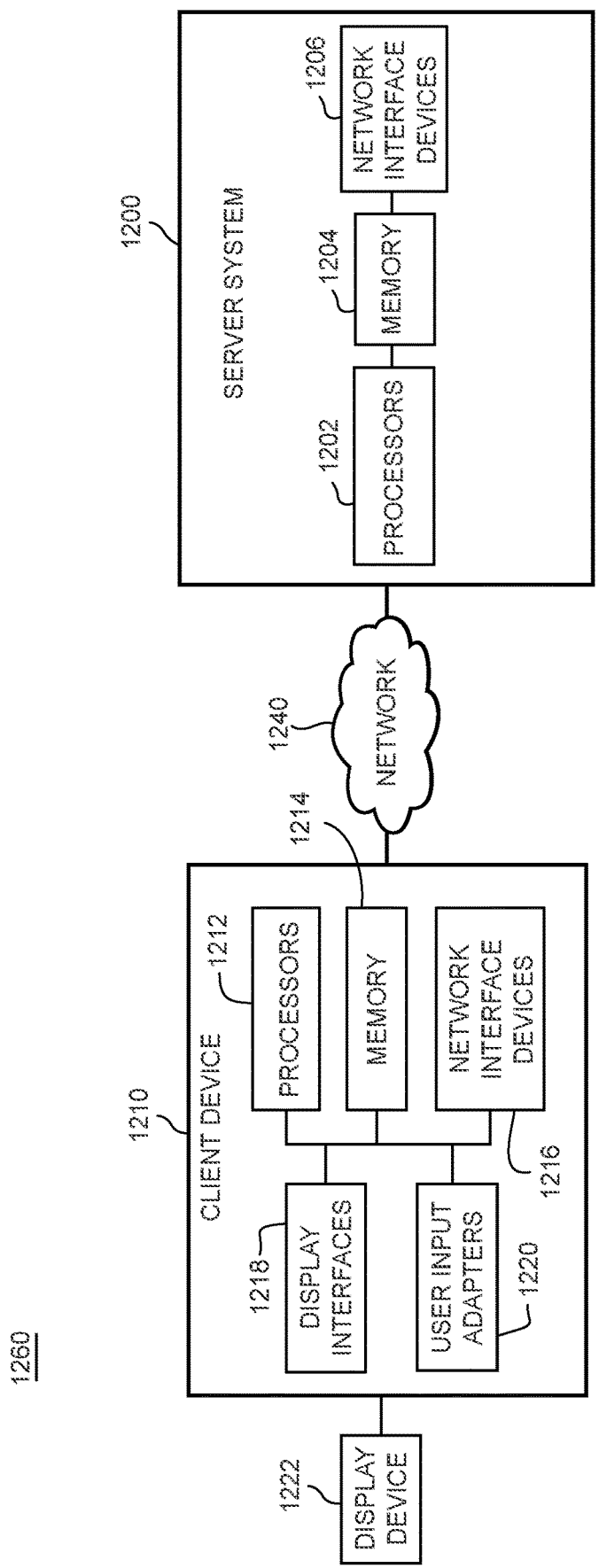
FIG. 7 shows a non-limiting example block diagram of hardware components comprising the system.

FIG. 7 shows a non-limiting example block diagram of a hardware architecture for the system 1260. In the example shown in FIG. 7, the client device 1210 communicates with a server system 1200 via a network 1240. The network 1240 could comprise a network of interconnected computing devices, such as the internet. The network 1240 could also comprise a local area network (LAN) or could comprise a peer-to-peer connection between the client device 1210 and the server system 1200. As will be described below, the hardware elements shown in FIG. 7 could be used to implement the various software components and actions shown and described above as being included in and/or executed at the client device 1210 and server system 1200.

In some embodiments, the client device 1210 (which may also be referred to as "client system" herein) includes one or more of the following: one or more processors 1212; one or more memory devices 1214; one or more network interface devices 1216; one or more display interfaces 1218; and one or more user input adapters 1220. Additionally, in some embodiments, the client device 1210 is connected to or includes a display device 1222. As will explained below, these elements (e.g., the processors 1212, memory devices 1214, network interface devices 1216, display interfaces 1218, user input adapters 1220, display device 1222) are hardware devices (for example, electronic circuits or combinations of circuits) that are configured to perform various different functions for the computing device 1210.

In some embodiments, each or any of the processors 1212 is or includes, for example, a single- or multi-core processor, a microprocessor (e.g., which may be referred to as a central processing unit or CPU), a digital signal processor (DSP), a microprocessor in association with a DSP core, an Application Specific Integrated Circuit (ASIC), a Field Programmable Gate Array (FPGA) circuit, or a system-on-a-chip (SOC) (e.g., an integrated circuit that includes a CPU and other hardware components such as memory, networking interfaces, and the like). And/or, in some embodiments, each or any of the processors 1212 uses an instruction set architecture such as x86 or Advanced RISC Machine (ARM).

In some embodiments, each or any of the memory devices 1214 is or includes a random access memory (RAM) (such as a Dynamic RAM (DRAM) or Static RAM (SRAM)), a flash memory (based on, e.g., NAND or NOR technology), a hard disk, a magneto-optical medium, an optical medium, cache memory, a register (e.g., that holds instructions), or other type of device that performs the volatile or non-volatile storage of data and/or instructions (e.g., software that is executed on or by processors 1212). Memory devices 1214 are examples of non-volatile computer-readable storage media.

In some embodiments, each or any of the network interface devices 1216 includes one or more circuits (such as a baseband processor and/or a wired or wireless transceiver), and implements layer one, layer two, and/or higher layers for one or more wired communications technologies (such as Ethernet (IEEE 802.3)) and/or wireless communications technologies (such as Bluetooth, WiFi (IEEE 802.11), GSM, CDMA2000, UMTS, LTE, LTE-Advanced (LTE-A), and/or other short-range, mid-range, and/or long-range wireless communications technologies). Transceivers may comprise circuitry for a transmitter and a receiver. The transmitter and receiver may share a common housing and may share some or all of the circuitry in the housing to perform transmission and reception. In some embodiments, the transmitter and receiver of a transceiver may not share any common circuitry and/or may be in the same or separate housings.

In some embodiments, each or any of the display interfaces 1218 is or includes one or more circuits that receive data from the processors 1212, generate (e.g., via a discrete GPU, an integrated GPU, a CPU executing graphical processing, or the like) corresponding image data based on the received data, and/or output (e.g., a High-Definition Multimedia Interface (HDMI), a DisplayPort Interface, a Video Graphics Array (VGA) interface, a Digital Video Interface (DVI), or the like), the generated image data to the display device 1222, which displays the image data. Alternatively or additionally, in some embodiments, each or any of the display interfaces 1218 is or includes, for example, a video card, video adapter, or graphics processing unit (GPU).

In some embodiments, each or any of the user input adapters 1220 is or includes one or more circuits that receive and process user input data from one or more user input devices (not shown in FIG. 7) that are included in, attached to, or otherwise in communication with the client device 1210, and that output data based on the received input data to the processors 1212. Alternatively or additionally, in some embodiments each or any of the user input adapters 1220 is or includes, for example, a PS/2 interface, a USB interface, a touchscreen controller, or the like; and/or the user input adapters 1220 facilitates input from user input devices (not shown in FIG. 7) such as, for example, a keyboard, mouse, trackpad, touchscreen, etc. . . .

In some embodiments, the display device 1222 may be a Liquid Crystal Display (LCD) display, Light Emitting Diode (LED) display, or other type of display device. In embodiments where the display device 1222 is a component of the client device 1210 (e.g., the computing device and the display device are included in a unified housing), the display device 1222 may be a touchscreen display or non-touchscreen display. In embodiments where the display device 1222 is connected to the client device 1210 (e.g., is external to the client device 1210 and communicates with the client device 1210 via a wire and/or via wireless communication technology), the display device 1222 is, for example, an external monitor, projector, television, display screen, etc. . . .

In various embodiments, the client device 1210 includes one, or two, or three, four, or more of each or any of the above-mentioned elements (e.g., the processors 1212, memory devices 1214, network interface devices 1216, display interfaces 1218, and user input adapters 1220). Alternatively or additionally, in some embodiments, the client device 1210 includes one or more of: a processing system that includes the processors 1212; a memory or storage system that includes the memory devices 1214; and a network interface system that includes the network interface devices 1216.

The client device 1210 may be arranged, in various embodiments, in many different ways. As just one example, the client device 1210 may be arranged such that the processors 1212 include: a multi (or single)-core processor; a first network interface device (which implements, for example, WiFi, Bluetooth, NFC, etc. . . . ); a second network interface device that implements one or more cellular communication technologies (e.g., 3G, 4G LTE, CDMA, etc. . . . ); memory or storage devices (e.g., RAM, flash memory, or a hard disk). The processor, the first network interface device, the second network interface device, and the memory devices may be integrated as part of the same SOC (e.g., one integrated circuit chip). As another example, the client device 1210 may be arranged such that: the processors 1212 include two, three, four, five, or more multi-core processors; the network interface devices 1216 include a first network interface device that implements Ethernet and a second network interface device that implements WiFi and/or Bluetooth; and the memory devices 1214 include a RAM and a flash memory or hard disk.

Server system 1200 also comprises various hardware components used to implement the software elements for server system(s) 20. In some embodiments, the server system 1200 (which may also be referred to as "server device" herein) includes one or more of the following: one or more processors 1202; one or more memory devices 1204; and one or more network interface devices 1206. As will explained below, these elements (e.g., the processors 1202, memory devices 1204, network interface devices 1206) are hardware devices (for example, electronic circuits or combinations of circuits) that are configured to perform various different functions for the server system 1200.

In some embodiments, each or any of the processors 1202 is or includes, for example, a single- or multi-core processor, a microprocessor (e.g., which may be referred to as a central processing unit or CPU), a digital signal processor (DSP), a microprocessor in association with a DSP core, an Application Specific Integrated Circuit (ASIC), a Field Programmable Gate Array (FPGA) circuit, or a system-on-a-chip (SOC) (e.g., an integrated circuit that includes a CPU and other hardware components such as memory, networking interfaces, and the like). And/or, in some embodiments, each or any of the processors 1202 uses an instruction set architecture such as x86 or Advanced RISC Machine (ARM).

In some embodiments, each or any of the memory devices 1204 is or includes a random access memory (RAM) (such as a Dynamic RAM (DRAM) or Static RAM (SRAM)), a flash memory (based on, e.g., NAND or NOR technology), a hard disk, a magneto-optical medium, an optical medium, cache memory, a register (e.g., that holds instructions), or other type of device that performs the volatile or non-volatile storage of data and/or instructions (e.g., software that is executed on or by processors 1202). Memory devices 1204 are examples of non-volatile computer-readable storage media.

In some embodiments, each or any of the network interface devices 1206 includes one or more circuits (such as a baseband processor and/or a wired or wireless transceiver), and implements layer one, layer two, and/or higher layers for one or more wired communications technologies (such as Ethernet (IEEE 802.3)) and/or wireless communications technologies (such as Bluetooth, WiFi (IEEE 802.11), GSM, CDMA2000, UMTS, LTE, LTE-Advanced (LTE-A), and/or other short-range, mid-range, and/or long-range wireless communications technologies). Transceivers may comprise circuitry for a transmitter and a receiver. The transmitter and receiver may share a common housing and may share some or all of the circuitry in the housing to perform transmission and reception. In some embodiments, the transmitter and receiver of a transceiver may not share any common circuitry and/or may be in the same or separate housings.

In various embodiments, the server system 1200 includes one, or two, or three, four, or more of each or any of the above-mentioned elements (e.g., the processors 1202, memory devices 1204, network interface devices 1206). Alternatively or additionally, in some embodiments, the server system 1200 includes one or more of: a processing system that includes the processors 1202; a memory or storage system that includes the memory devices 1204; and a network interface system that includes the network interface devices 1206.

The server system 1200 may be arranged, in various embodiments, in many different ways. As just one example, the server system 1200 may be arranged such that the processors 1202 include: a multi (or single)-core processor; a first network interface device (which implements, for example, WiFi, Bluetooth, NFC, etc. . . . ); a second network interface device that implements one or more cellular communication technologies (e.g., 3G, 4G LTE, CDMA, etc. . . . ); memory or storage devices (e.g., RAM, flash memory, or a hard disk). The processor, the first network interface device, the second network interface device, and the memory devices may be integrated as part of the same SOC (e.g., one integrated circuit chip). As another example, the server system 1200 may be arranged such that: the processors 1202 include two, three, four, five, or more multi-core processors; the network interface devices 1206 include a first network interface device that implements Ethernet and a second network interface device that implements WiFi and/or Bluetooth; and the memory devices 1204 include a RAM and a flash memory or hard disk.

As previously noted, whenever it is described in this document that a software module or software process performs any action, the action is in actuality performed by underlying hardware elements according to the instructions that comprise the software module. Consistent with the foregoing, in various embodiments, each or any combination of the client device 1210 or the server system 1200, each of which will be referred to individually for clarity as a "component" for the remainder of this paragraph, are implemented using an example of the client device 1210 or the server system 1200 of FIG. 7.

In such embodiments, the following applies for each component: (a) the elements of the client device 1210 shown in FIG. 7 (i.e., the one or more processors 1212, one or more memory devices 1214, one or more network interface devices 1216, one or more display interfaces 1218, and one or more user input adapters 1220) and the elements of the server system 1200 (i.e., the one or more processors 1202, one or more memory devices 1204, one or more network interface devices 1206), or appropriate combinations or subsets of the foregoing, are configured to, adapted to, and/or programmed to implement each or any combination of the actions, activities, or features described herein as performed by the component and/or by any software modules described herein as included within the component; (b) alternatively or additionally, to the extent it is described herein that one or more software modules exist within the component, in some embodiments, such software modules (as well as any data described herein as handled and/or used by the software modules) are stored in the respective memory devices (e.g., in various embodiments, in a volatile memory device such as a RAM or an instruction register and/or in a non-volatile memory device such as a flash memory or hard disk) and all actions described herein as performed by the software modules are performed by the respective processors in conjunction with, as appropriate, the other elements in and/or connected to the client device 1210 or server system 1200; (c) alternatively or additionally, to the extent it is described herein that the component processes and/or otherwise handles data, in some embodiments, such data is stored in the respective memory devices (e.g., in some embodiments, in a volatile memory device such as a RAM and/or in a non-volatile memory device such as a flash memory or hard disk) and/or is processed/handled by the respective processors in conjunction, as appropriate, the other elements in and/or connected to the client device 1210 or server system 1200; (d) alternatively or additionally, in some embodiments, the respective memory devices store instructions that, when executed by the respective processors, cause the processors to perform, in conjunction with, as appropriate, the other elements in and/or connected to the client device 1210 or server system 1200, each or any combination of actions described herein as performed by the component and/or by any software modules described herein as included within the component.

The hardware configurations shown in FIG. 7 and described above are provided as examples, and the subject matter described herein may be utilized in conjunction with a variety of different hardware architectures and elements. For example: in many of the Figures in this document, individual functional/action blocks are shown; in various embodiments, the functions of those blocks may be implemented using (a) individual hardware circuits, (b) using an application specific integrated circuit (ASIC) specifically configured to perform the described functions/actions, (c) using one or more digital signal processors (DSPs) specifically configured to perform the described functions/actions, (d) using the hardware configuration described above with reference to FIG. 7, (e) via other hardware arrangements, architectures, and configurations, and/or via combinations of the technology described in (a) through (e).

In many places in this document, software modules and actions performed by software modules are described. This is done for ease of description; it should be understood that, whenever it is described in this document that a software module performs any action, the action is in actuality performed by underlying hardware components (such as a processor and a memory) according to the instructions and data that comprise the software module.

Technical Advantages

The technology described herein provides improvements to existing technology for determining whether a user has modified a program running on the user device. In particular, the technology allows for automatic creation of different attestation programs that can be stored on a remote-side device (e.g., a server system) and then the remote-side device can run "attestation checks" against programs running on different client devices. By comparing results produced from the client devices during the "attestation checks," the remote-side device can determine if the client device has modified the particular program.

The technology herein thus allows for the remote-side device to automatically generate attestation programs for remotely detecting whether different client-side devices have modified programs on the client-side devices. Such an approach advantageously enables the remote-side device to perform "attestation checks" without requiring the attestation logic on the client-side device. In doing so, the technology prevents the client side device from being able to modify the attestation logic thus requiring the remote-side device to fix such modifications through widely deployed software patches. The technology thus improves the overall security of the system as well as the human-user interface experience. Moreover, by reducing the need for deploying various software patches, the system reduces the amount of communication between components in the system thus improving the overall communication bandwidth of the system.

Selected Definitions

Whenever it is described in this document that a given item is present in "some embodiments," "various embodiments," "certain embodiments," "certain example embodiments, "some example embodiments," "an exemplary embodiment," or whenever any other similar language is used, it should be understood that the given item is present in at least one embodiment, though is not necessarily present in all embodiments. Consistent with the foregoing, whenever it is described in this document that an action "may," "can," or "could" be performed, that a feature, element, or component "may," "can," or "could" be included in or is applicable to a given context, that a given item "may," "can," or "could" possess a given attribute, or whenever any similar phrase involving the term "may," "can," or "could" is used, it should be understood that the given action, feature, element, component, attribute, etc. is present in at least one embodiment, though is not necessarily present in all embodiments. Terms and phrases used in this document, and variations thereof, unless otherwise expressly stated, should be construed as open-ended rather than limiting. As examples of the foregoing: "and/or" includes any and all combinations of one or more of the associated listed items (e.g., a and/or b means a, b, or a and b); the singular forms "a", "an" and "the" should be read as meaning "at least one," "one or more," or the like; the term "example" is used provide examples of the subject under discussion, not an exhaustive or limiting list thereof; the terms "comprise" and "include" (and other conjugations and other variations thereof) specify the presence of the associated listed items but do not preclude the presence or addition of one or more other items; and if an item is described as "optional," such description should not be understood to indicate that other items are also not optional.

As used herein, the term "non-transitory computer-readable storage medium" includes a register, a cache memory, a ROM, a semiconductor memory device (such as a D-RAM, S-RAM, or other RAM), a magnetic medium such as a flash memory, a hard disk, a magneto-optical medium, an optical medium such as a CD-ROM, a DVD, or Blu-Ray Disc, or other type of device for non-transitory electronic data storage. The term "non-transitory computer-readable storage medium" does not include a transitory, propagating electromagnetic signal.

Further Applications of Described Subject Matter

Although process steps, algorithms or the like, including without limitation with reference to FIGS. 1-7, may be described or claimed in a particular sequential order, such processes may be configured to work in different orders. In other words, any sequence or order of steps that may be explicitly described or claimed in this document does not necessarily indicate a requirement that the steps be performed in that order; rather, the steps of processes described herein may be performed in any order possible. Further, some steps may be performed simultaneously (or in parallel) despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary, and does not imply that the illustrated process is preferred.

Although various embodiments have been shown and described in detail, the claims are not limited to any particular embodiment or example. None of the above description should be read as implying that any particular element, step, range, or function is essential. All structural and functional equivalents to the elements of the above-described embodiments that are known to those of ordinary skill in the art are expressly incorporated herein by reference and are intended to be encompassed. Moreover, it is not necessary for a device or method to address each and every problem sought to be solved by the present invention, for it to be encompassed by the invention. No embodiment, feature, element, component, or step in this document is intended to be dedicated to the public.

The invention claimed is:

1. A system for detecting modifications to program data, comprising:
    a processor; and
    a memory configured to store computer readable instructions that, when executed by the processor, cause the system to:
        obtain program code for a first program configured for execution on a client device;
        scan the program code for the first program for usable code sequences;
        combine portions of the usable code sequences to form a first attestation program having a first attestation result;
        store the first attestation program having the first attestation result into a database in the memory of the system;
        transmit data associated with the first attestation program to the client device to run an attestation check against the first program executing on the client device, the attestation check generating a first attestation check result;
        receive the first attestation check result from the client device;
        compare the first attestation check result to the first attestation result associated with the first attestation program to determine if the first attestation result matches the first attestation check result; and
        perform an action associated with the client device based on the comparison.

2. The system of claim 1, wherein a type of modification to the first program can be determined based on the comparison.

3. The system of claim 1, wherein
    the client device is a game device,
    the first program is a game program running on the game device, and
    the modification to the first program indicates user cheating associated with the game program.

4. The system of claim 1, wherein the program code for the first program is scanned using a software tool, and the usable code sequences are detected from scanning the first program using the software tool.

5. The system of claim 4, wherein the usable code sequences are located at an end portion of a software function.

6. A system for detecting modifications to program data, comprising:
    a processor; and
    a memory configured to store a first attestation program having a first attestation result, the first attestation program formed from usable code sequences associated with program code of a first program, the memory further configured to store computer readable instructions that, when executed by the processor, cause the system to:

transmit data associated with the first attestation program to the client device to run an attestation check against the first program executing on the client device, the attestation check generating a first attestation check result;

receive the first attestation check result from the client device; and perform an action associated with the client device based on the first attestation check result.

7. The system of claim 6, wherein the usable code sequences are combined to form the first attestation program.

8. The system of claim 7, wherein forming the first attestation program comprises:

combining the usable code sequences to form a first attestation algorithm; and converting the first attestation algorithm into the first attestation program by listing references to code sequences from first program binary, associated with the first program, in an order used by the first attestation algorithm.

9. The system of claim 6, wherein the first attestation check result is compared to the first attestation result associated with the first attestation program to determine if the first attestation result matches the first attestation check result.

10. The system of claim 6, wherein the action performed in association with the client device includes at least one of flagging the client device, sending a warning to the client device, locking the client device, banning the client device, and/or taking no action associated with the client device.

11. A non-transitory computer readable storage medium storing computer readable instructions that, when executed by a processor a system, cause the system to provide execution comprising:

scanning program code for a first program, configured for execution on a client device, for useable code sequences;

combining portions of the usable code sequences to form a first attestation program having a first attestation result, and storing the first attestation program in the memory;

running an attestation check against the first program executing on the client device in association with the first attestation program having the first attestation result; and performing an action associated with the client device based on the attestation check.

12. The non-transitory computer readable storage medium of claim 11, wherein running the attestation check against the first program executing on the client device produces a first attestation check result.

13. The non-transitory computer readable storage medium of claim 12, wherein the first attestation check result is compared to the first attestation result associated with the first attestation program to determine if the first attestation result matches the first attestation check result.

14. The non-transitory computer readable storage medium of claim 11, wherein the action performed in association with the client device includes at least one of flagging the client device, sending a warning to the client device, locking the client device, banning the client device, and/or taking no action associated with the client device.

15. The non-transitory computer readable storage medium of claim 11, wherein the first attestation program is formed using a return-orientation programming technique.

16. A method for detecting modifications to program data, comprising:

scanning program code for a first program, configured for execution on a client device, for useable code sequences;

combining portions of the usable code sequences to form a first attestation program having a first attestation result, and storing the first attestation program in the memory;

transmitting data associated with the first attestation program to the client device to run an attestation check against the first program executing on the client device to produce a first attestation check result;

receiving the first attestation check result from the client device; and performing an action associated with the client device based on the first attestation check result.

17. The method of claim 16, wherein the first attestation check result is compared to the first attestation result associated with the first attestation program to determine if the first attestation result matches the first attestation check result.

18. The method of claim 16, wherein the action performed in association with the client device includes at least one of flagging the client device, sending a warning to the client device, locking the client device, banning the client device, and/or taking no action associated with the client device.

19. The method of claim 16, wherein the usable code sequences are located at an end portion of a software function.

20. The method of claim 16, wherein the first attestation program is generated using a return-orientation programming technique.

* * * * *